US010525767B2

(12) United States Patent
Kawai et al.

(10) Patent No.: US 10,525,767 B2
(45) Date of Patent: Jan. 7, 2020

(54) WHEEL FOR VEHICLE

(71) Applicant: TOPY KOGYO KABUSHIKI KAISHA, Tokyo (JP)

(72) Inventors: Masaki Kawai, Tokyo (JP); Jiro Yazawa, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 106 days.

(21) Appl. No.: 15/555,351

(22) PCT Filed: Mar. 17, 2016

(86) PCT No.: PCT/JP2016/058504
§ 371 (c)(1),
(2) Date: Sep. 1, 2017

(87) PCT Pub. No.: WO2016/148239
PCT Pub. Date: Sep. 22, 2016

(65) Prior Publication Data
US 2018/0037055 A1 Feb. 8, 2018

(30) Foreign Application Priority Data

Mar. 19, 2015 (JP) .................................. 2015-055529

(51) Int. Cl.
*B60B 21/02* (2006.01)
*B60B 3/04* (2006.01)
(Continued)

(52) U.S. Cl.
CPC ................ *B60B 21/02* (2013.01); *B60B 3/04* (2013.01); *B60B 7/01* (2013.01); *B60B 3/02* (2013.01);
(Continued)

(58) Field of Classification Search
CPC .. B60B 21/02; B60B 7/01; B60B 3/04; B60B 21/12; B60B 2900/1216; B60B 3/02; Y02T 10/88
(Continued)

(56) References Cited

U.S. PATENT DOCUMENTS 4,422,516 A * 12/1983 Yamaura ............... B60B 27/065
180/339
9,545,819 B2 * 1/2017 von Tardy-Tuch ....... B60B 3/02
(Continued)

FOREIGN PATENT DOCUMENTS

DE 102012107019 A1 2/2014
JP S46-28644 Y1 10/1971
(Continued)

OTHER PUBLICATIONS

International Search Report (English version) for International Application No. PCT/JP2016/058504 dated Jun. 14, 2016.
(Continued)

*Primary Examiner* — S. Joseph Morano
*Assistant Examiner* — Jean W Charleston
(74) *Attorney, Agent, or Firm* — Thomas B. Ryan; Jodi A. Reynolds, Esq.; Harter Secrest & Emery LLP

(57) ABSTRACT

A wheel for vehicle 1 is provided with a disc 10 and a rim 20 and has a braking device 30 housed therein. An annular flange portion 41 protruded inward from a bead seat portion 22 in a radial direction of the wheel 1 is disposed at an end of the rim 20 on a side opposite to the disc 10. The flange portion 41 has an inclined surface 41a on a side opposite to the disc 10. The flange portion 41 is inclined toward the disc 10 in a direction toward a central axis L of the wheel 1. The inclined surface 41a acts to reduce air resistance at the wheel 1 while the vehicle is running and guides a portion of an underfloor airflow to an inner space of the wheel 1 to secure an amount of air for cooling the braking device 30.

5 Claims, 7 Drawing Sheets

(51) Int. Cl.
   *B60B 7/01*      (2006.01)
   *B60B 21/12*     (2006.01)
   *B60B 3/02*      (2006.01)

(52) U.S. Cl.
   CPC ....... *B60B 21/12* (2013.01); *B60B 2900/1216* (2013.01); *Y02T 10/88* (2013.01)

(58) Field of Classification Search
   USPC .......................................................... 301/6.3
   See application file for complete search history.

(56) References Cited

U.S. PATENT DOCUMENTS

2005/0248212  A1*  11/2005  Tanno ...................... B60B 3/02
                                                          301/95.108
   2011/0198915  A1*  8/2011   Chashiro .................. B60B 3/04
                                                          301/63.103
   2015/0174955  A1   6/2015   Von Tardy-Tuch et al.

FOREIGN PATENT DOCUMENTS

| | | |
   |---|---|---|
   | JP | S62-33965 U    | 2/1987  |
   | JP | 90801/1987 U   | 6/1987  |
   | JP | 2000-351301 A  | 12/2000 |
   | JP | 2004-082811 A  | 3/2004  |
   | JP | 2008-137562 A  | 6/2008  |
   | JP | 2009-051248 A  | 3/2009  |
   | JP | 2010-006135 A  | 1/2010  |
   | JP | 2016-88394 A   | 5/2016  |

OTHER PUBLICATIONS

English translation of the International Preliminary Report on Patentability and Written Opinion of the International Searching Authority for PCT/JP2016/058504 dated Sep. 28, 2017.
   Japan Patent Office, Office Action in corresponding Japanese Patent Application No. 2017-506609, dated Oct. 29, 2019.

* cited by examiner

WHEEL FOR VEHICLE

FIELD OF THE INVENTION

The present invention relates to a wheel used for a vehicle.

BACKGROUND ART

When an object is moved in the air, a vortex of airflow is generated near a surface of the object. As a size of the vortex is increased, the air resistance is increased. It is known that the air resistance is increased in proportion to square of velocity of the movement of an object.

The air resistance against a wheel for vehicle is described below based on the principal given above. A wheel has a disc and a rim. The disc is disposed at an outer end (end on a side opposite to a vehicle body) of the rim in an axial direction of the wheel. A tire is mounted on an outer periphery of the rim.

While the vehicle is running, airflow from the front hits a front end of a rotating tire. The airflow flows rearward through opposite sides of the wheel (outside and inside in the axial direction of the wheel). The airflow flowing along the outside of the wheel is called side airflow. The airflow flowing under the vehicle body along the inside of the wheel (vehicle body side) is called underfloor airflow.

The side airflow flows relatively smoothly along one side surface of the tire and a designed surface of the disc. On the other hand, a vortex is generated from the underfloor airflow. Specifically, when the underfloor airflow passing through the other side surface of the tire reaches a large opening of the wheel, a portion of the underfloor airflow is separated and led into an inside of the opening. Thereby, the vortex is generated. The airflow containing the vortex is pushed out by the next vortex and blown out from openings of the disk through an inner space of the wheel. Then the airflow joins the side airflow, disturbing the side airflow and causing a vortex to be generated.

As mentioned above, an air resistance caused by the vortex is generated against the wheel. Air resistance is also generated by the underfloor airflow's hitting an inner wall surface of the rim in a rear portion of the wheel.

One of the measures to restrain the generation of the vortex may be to reduce an opening area of the openings of the disc, thereby limiting the amount of the portion of the underfloor airflow joining the side airflow. However, the design of the disc may be compromised in this measure. Moreover, since an amount of the air flowing in the inner space of the wheel is reduced, a braking device housed in the wheel may not be sufficiently cooled.

The Patent Document 1 discloses a wheel for vehicle in which the generation of the vortex is restrained and the air resistance is reduced. Specifically, an annular flow straightening member is attached to an end of a rim on a vehicle body side thereof (end on a side opposite to a disc). The flow straightening member is protruded inward from a bead seat portion in a radial direction, covering a portion of an opening of the wheel on the vehicle body side (portion in a vicinity of a peripheral edge of the opening). The flow straightening member has an annular flat surface on the vehicle body side thereof. The annular flat surface is orthogonal to a central axis of the wheel.

In the wheel of Patent Document 1, an underfloor airflow is straightened along the flat surface of the flow straightening member mentioned above, and the separation of the underfloor airflow in the opening is restrained. Therefore, generated amount of the vortex can be reduced, and an amount of the vortex generated by the portion of the underfloor airflow blowing out toward a side airflow can be reduced. Thereby, air resistance against the wheel can be reduced.

PRIOR ART DOCUMENTS

Patent Documents

Patent Document 1: Japanese Unexamined Patent Application Publication No. 2009-51248

SUMMARY OF THE INVENTION

Problem to be Solved by the Invention

In the device disclosed in Patent Document 1, the air resistance against the wheel is reduced. However, there is a problem that since the amount of air flowing into an inner space of the wheel is reduced, a cooling performance to cool a braking device housed in the wheel may decline.

Patent Document 1 discloses another embodiment in which an air intake vent is formed in the flow straightening member to lead air into the inner space of the wheel to cool the braking device. However, since the air intake vent is open to the flat surface orthogonal to the central axis of the wheel, an amount of the portion of the underfloor airflow flowing into the inner space of the wheel through the air intake vent is small. Therefore, it is not expected to cool the braking device sufficiently in this embodiment.

Solution to Problems

To solve the problems mentioned above, the present invention provides a wheel for vehicle including: a disc; a rim; a braking device housed therein, an annular flow straightener disposed at an end of the rim on a side opposite to the disc; and the flow straightener having an annular protruded portion protruded inward from a bead seat portion of the rim in a radial direction of the wheel, wherein the protruded portion has an annular inclined surface on a side opposite to the disc, the inclined surface inclined toward the disc in a direction toward a central axis of the wheel.

According to the features mentioned above, generation of a vortex due to separation of an underfloor airflow can be restrained by the inclined surface of the protruded portion of the flow straightener. Thereby, an air resistance can be reduced. Moreover, a sufficient amount of air for cooling the braking device can be guided to the inner space of the wheel by the inclined surface of the flow straightener.

Preferably, the flow straightener has an annular wall portion extending along a rim flange portion of the rim; a side surface of the wall portion on a side opposite to the disc is a flat surface orthogonal to the central axis of the wheel; and the side surface continues to the inclined surface.

According to the features mentioned above, since the flat side surface orthogonal to the central axis of the wheel continues to the inclined surface, the air resistance can be further reduced.

Preferably, the inclined surface is inclined 5 to 15 degrees with respect to a plane orthogonal to the central axis of the wheel.

According to the features mentioned above, the effect of reducing the air resistance and the effect of cooling the braking device can be attained in a well-balanced manner. If the inclination angle were less than 5 degrees, a sufficient amount of airflow for cooling the braking device would not be secured. If the inclination angle were greater than 15 degrees, the air resistance would be increased, and therefore, an effect of the flow straightener would be diminished although the sufficient amount of airflow for cooling the braking device might be secured.

Preferably, the protruded portion of the flow straightener has a configuration of an annular flange.

According to the features mentioned above, increase in weight of the wheel can be restrained.

Preferably, the inclined surface of the protruded portion is provided as a first inclined surface; the protruded portion further has a second inclined surface having an annular configuration and oriented toward the disc; the second inclined surface is inclined away from the disc in the direction toward the central axis of the wheel; and an annular top portion is formed where the first inclined surface and the second inclined surface intersect with each other.

According to the features mentioned above, generation of the vortex due to the separation of the underfloor airflow in a front portion of the wheel can be restrained. Moreover, the air resistance can be further reduced because when the underfloor airflow hits an inner wall surface of the rim in a rear portion of the wheel, the underfloor airflow is divided at the top portion of the flow straightener and flown smoothly along the first and second inclined surfaces.

In one aspect of the present invention, the flow straightener is integrally formed with the rim.

In another aspect of the present invention, the flow straightener is a separate component from the rim; and the flow straightener is attached to the rim.

Preferably, the flow straightener is provided as an annular member that is a separate component from the rim; the annular member integrally has the protruded portion, the wall portion and an attachment portion protruded in an axial direction of the wheel from a boundary of the protruded portion and the wall portion; and the attachment portion is fitted in an inner periphery of the bead seat portion.

According to the features mentioned above, the annular member that is a separate component from the rim can be relatively easily mounted to the rim.

Advantageous Effects of the Invention

In the wheel for vehicle according to the present invention, the air resistance can be reduced while an amount of airflow in the wheel for cooling the braking device can be secured.

DESCRIPTION OF THE PREFERRED EMBODIMENTS

A wheel for vehicle according to a first embodiment of the present invention will be described hereinafter with reference to FIGS. 1 and 2.

Figure 1:
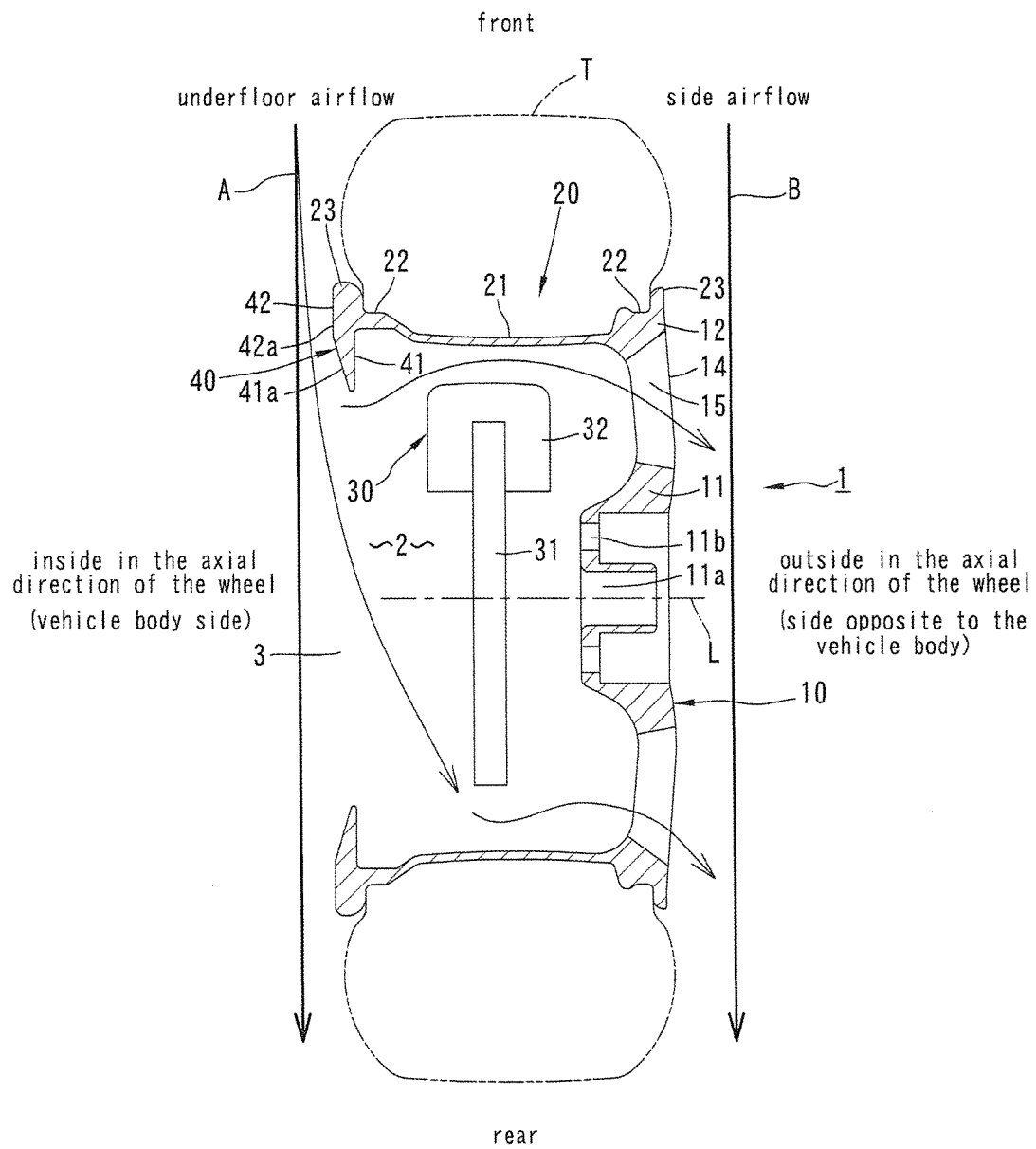
FIG. 1 is a plane cross-sectional view of a wheel for vehicle according to a first embodiment of the present invention.
Figure 2:
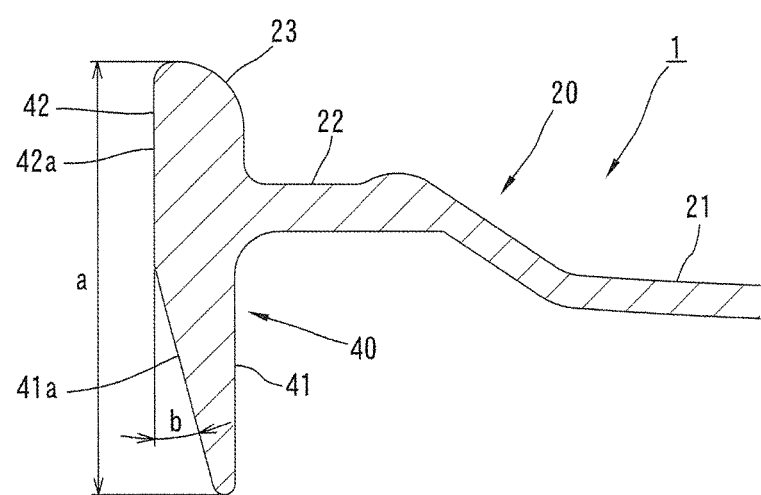
FIG. 2 is an enlarged cross-sectional view of a flow straightener that is an important portion of the wheel for vehicle.

A wheel for vehicle 1 shown in FIG. 1 is made of a cast aluminum alloy (light metal), for example. The wheel for vehicle 1 integrally includes a disc 10 having a generally circular disc configuration and a rim 20 having a generally circular cylindrical configuration that continues from a peripheral edge of the disc 10. A tire T is mounted on an outer periphery of the rim 20.

The disc 10 has a hub attachment portion 11 having a circular disc configuration in a central portion thereof, a peripheral edge portion 12 having an annular configuration and spoke portions 14 extending radially for connecting the hub attachment portion 11 and the peripheral edge portion 12.

A hub hole 11a and a plurality of bolt holes 11b are formed in the hub attachment portion 11. Openings 15 are formed between the spoke portions 14.

As with a standard rim of a wheel, the rim 20 includes a rim drop portion 21, a pair of bead seat portions 22 that continues from opposite ends of the rim drop portion 21 and a pair of rim flange portions 23.

The disc 10 is disposed at an end of the rim 20 located outside (side opposite to a vehicle body) in an axial direction of the wheel. An inner space 2 of the wheel 1 is formed by the disc 10 and the rim 20. An opening 3 is formed in an inside of the rim 20 (vehicle body side) in the axial direction of the wheel.

A hub (not shown) of a vehicle extends into the inner space 2 through the opening 3. The hub attachment portion 11 of the disc 10 is fixed to the hub. A braking device 30 is received in the inner space 2.

The braking device 30 includes a brake rotor 31 fixed to the hub (not shown) and a brake caliper 32. The brake caliper 32 has a pair of brake pads (not shown) moved by hydraulic cylinder. Braking by friction can be realized by pressing the brake pads against the brake rotor 31.

The openings 15 not only improve design but also let out heat generated by the braking device 30.

Special features of the present invention will be described below. As shown in FIGS. 1 and 2, an annular flow straightener 40 is provided at an end of the rim 20 on the vehicle body side (side opposite to the disc 10). The flow straightener 40 is formed integrally with the rim 20. The flow straightener 40 has an annular flange portion 41 (protruded portion having a configuration of a flange) and an annular wall portion 42. The flange portion 41 is protruded inward from the bead seat portion 22 in a radial direction of the wheel 1. The wall portion 42 extends along the rim flange portion 23 and is formed integrally with the rim flange portion 23.

A side surface of the flange portion 41 on the vehicle body side is an inclined surface 41a (tapered surface, conical surface) inclined toward the disc 10 in a direction toward a central axis L. A side surface of the wall portion 42 on the vehicle body side is an annular flat surface 42a orthogonal to the central axis L of the wheel 1. The flat surface 42a is continuous from the inclined surface 41a.

A width a of the flow straightener 40 in the radial direction of the wheel and an angle b of the inclined surface 41a are determined so as to restrain the partial separation of an underfloor airflow (airflow entering through the opening 3) and at the same time to secure an amount of airflow required for cooling the braking device 30 inside the wheel 1. Preferably, the width a is from 50 mm to 80 mm. Preferably, the angle b of the inclined surface 41a is from 5 degrees to 15 degrees. If the angle b is less than 5 degrees, it is difficult to secure the amount of airflow for cooling the braking device 30. If the angle b is greater than 15 degrees, air resistance is increased and an effect of the flow straightener 40 is reduced although the amount of airflow for cooling may be secured.

In this embodiment, the wheel 1 and the flow straightener 40 are integrally formed. Specifically, after the wheel 1 is casted, the flow straightener 40 is formed by flow forming and machine processing.

Action of the wheel 1 is described below.

As indicated by arrow A in FIG. 1, the underfloor airflow is straightened by the flat surface 42a of the wall portion 42 and the inclined surface 41a of the flange portion 41 that continues from the flat surface 42a in a front portion of the wheel 1 while the vehicle is running. Therefore, the separation of the airflow is restricted, and generation of vortex is restricted. Thereby, the air resistance is reduced. Moreover, since the underfloor airflow A is straightened to flow backward, the underfloor airflow A is restricted from hitting an inner wall surface of the rim 20 in the rear portion of the wheel 1. Thereby, air resistance caused by the hitting of the inner wall surface by the underfloor airflow A is also reduced.

A portion of the underfloor airflow A is guided to the inside of the wheel 1 by the inclined surface 41a and cools the braking device 30. Then the underfloor airflow A flows out of the wheel 1 through the openings 15 of the disc 10 and joins a side airflow B that flows outside of the wheel 1.

The flow straightener 40 is disposed on the vehicle body side of the rim 20, and therefore, the flow straightener 40 is less visible from outside. Modification such as reducing opening areas of the openings 15 of the disc 10 is not required to reduce the air resistance. Therefore, the design of the wheel is not compromised.

Other embodiments of the present invention will be described hereinafter with reference to the drawings. In the description of these embodiments, same reference numerals will be used to indicate features corresponding to those of foregoing embodiments, and explanation thereof will be omitted.

Figure 3:
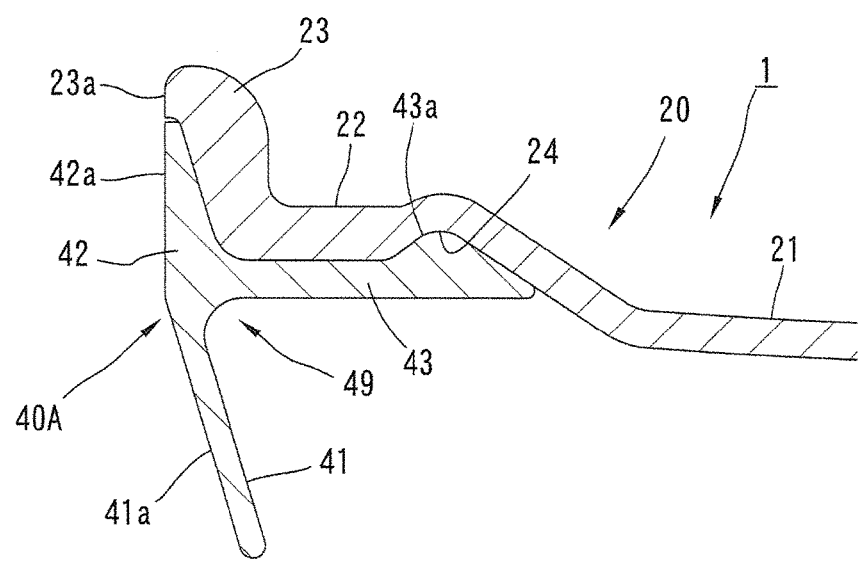
FIG. 3 is an enlarged cross-sectional view of a flow straightener of a wheel for vehicle according to a second embodiment of the present invention.

In a second embodiment shown in FIG. 3, a flow straightener 40A is made of an annular member 49 that is a separate component from a rim 20. The annular member 49 includes a flange portion 41 having an inclined surface 41a, a wall portion 42 having a flat surface 42a and a plurality of attachment portions 43 protruded outward from near a boundary of the flange portion 41 and the wall portion 42 in an axial direction of a wheel. The plurality of attachment portions 43 are formed spaced from each other in a circumferential direction. A protrusion 43a is formed outside of a distal end portion of the attachment portion 43 in a radial direction of the wheel. When the annular member 49 is pressed into the rim 20, the attachment portions 43 are elastically deformed and the protrusions 43a ride over a bead seat portion 22. When the annular member 49 is pressed further into the rim 20, the protrusions 43a are fitted into annular notches 24 formed in an inner peripheral surface of the rim 20 adjacent to the bead seat portion 22, and the attachment portions 43 are elastically returned.

In a state where the annular member 49 is attached, the flange portion 41 is protruded inward from the bead seat portion 22 in the radial direction of the wheel. The wall portion 42 is contacted with a side surface of a rim flange portion 23 on the vehicle body side and the flat surface 42a of the wall portion 42 is flush with a side surface 23a of an outer peripheral edge of the rim flange portion 23 on the vehicle body side.

Since an action of the flow straightener 40A while the vehicle is running is similar to that of the flow straightener in the first embodiment, a description thereof will be omitted.

Figure 4:
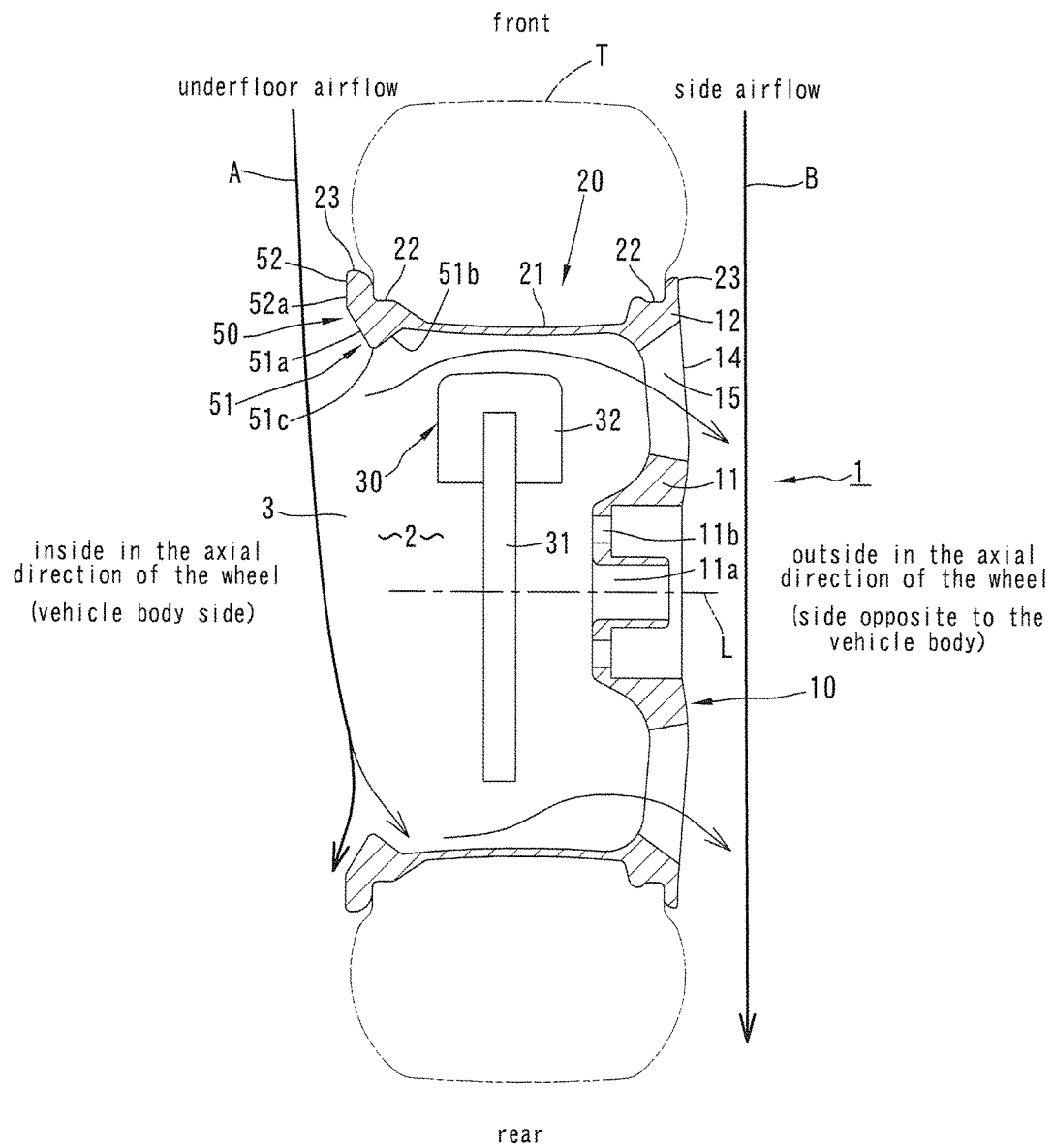
FIG. 4 is a plane cross-sectional view of a wheel for vehicle according to a third embodiment of the present invention.

In a third embodiment shown in FIG. 4, an annular flow straightener 50 is formed at an end of a rim 20 on the vehicle body side. The flow straightener 50 includes an annular protruded portion 51 and a wall portion 52. The protruded portion 51 has a triangular cross-sectional configuration and is protruded inward from a bead seat portion 22 in a radial direction of a wheel 1. The wall portion 52 is disposed on the vehicle body side of a rim flange portion 23 and is formed integrally with the rim flange portion 23.

As shown in FIG. 4, the protruded portion 51 has an annular first inclined surface 51a (tapered surface, conical surface) farther from the disc 10 and an annular second inclined surface 51b (tapered surface, conical surface) closer to the disc 10. As with the inclined surface 41a in the first and second embodiments, the first inclined surface 51a is inclined toward the disc 10 in a direction toward a central axis L of the wheel 1. The second inclined surface 51b is inclined away from the disc 10 in a direction toward the central axis L of the wheel 1.

Cross-sectional outlines of the first inclined surface 51a and the second inclined surface 51b may be straight or curved.

An annular top portion 51c is formed where the first inclined surface 51a and the second inclined surface 51b intersect with each other. A cross-sectional outline of the top portion 51c may be pointed. However, it is preferable that the cross-sectional outline of the top portion 51c is a convex curve having a relatively small radius of curvature.

A flat surface 52a orthogonal to the central axis of the wheel is provided on the vehicle body side of the wall portion 52. The flat surface 52a is continuous from the inclined surface 51a.

As with the first and second embodiments, as indicated by arrow A in FIG. 4, an underfloor airflow is straightened by the flat surface 52a and the inclined surface 51a in a front portion of the wheel 1 and a portion of the underfloor airflow is guided by the inclined surface 51a to cool a braking device 30.

In the third embodiment, the following effects can also be achieved. In a rear portion of the wheel 1, when the underfloor airflow A hits an inner wall surface of the rim 20, the underfloor airflow A is divided at the top portion 51c of the protruded portion 51 into a flow along the inclined surface 51a and a flow along the inclined surface 51b. The airflow flowing along the inclined surface 51a is straightened by the flat surface 52a and flows rearward. The airflow flowing along the inclined surface 51b is guided by an inside of the wheel 1 and cools the braking device 30. Then the airflow flows out of the wheel 1 through openings 15 of the disc 10 and joins a side airflow flowing outside of the wheel 1.

Since the portion of the underfloor airflow is divided and smoothly flows along the inclined surfaces 51a, 51b as mentioned above, air resistance can be reduced.

As with the first and second embodiments, an inclination angle of the inclined surface 51a is preferably from 5 degrees to 15 degrees in the third embodiment. However, a larger inclination angle is acceptable because a portion of increase in the air resistance due to the increase in the inclination angle is cancelled out by the reduction in the air resistance due to the division of the flow mentioned above.

Figure 5:
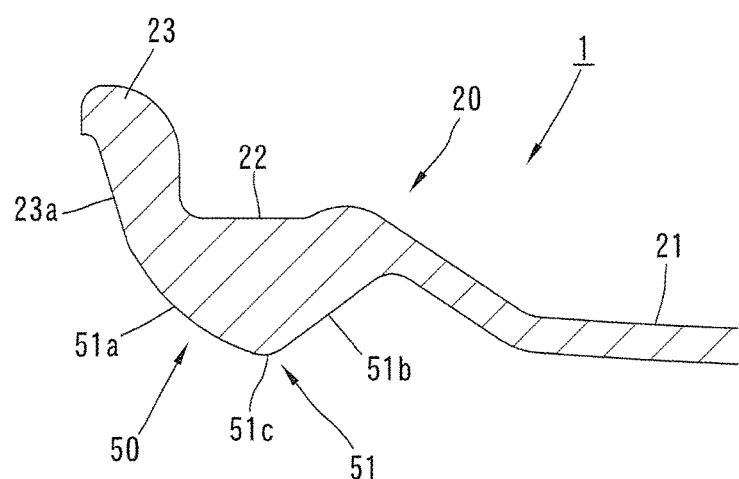
FIG. 5 is an enlarged cross-sectional view of a flow straightener of a wheel for vehicle according to a fourth embodiment of the present invention.

In a fourth embodiment shown in FIG. 5, a cross-sectional outline of a first inclined surface 51a is convexly curved and smoothly continues to an inclined side surface 23a of a rim flange portion 23 on a vehicle body side.

Figure 6:
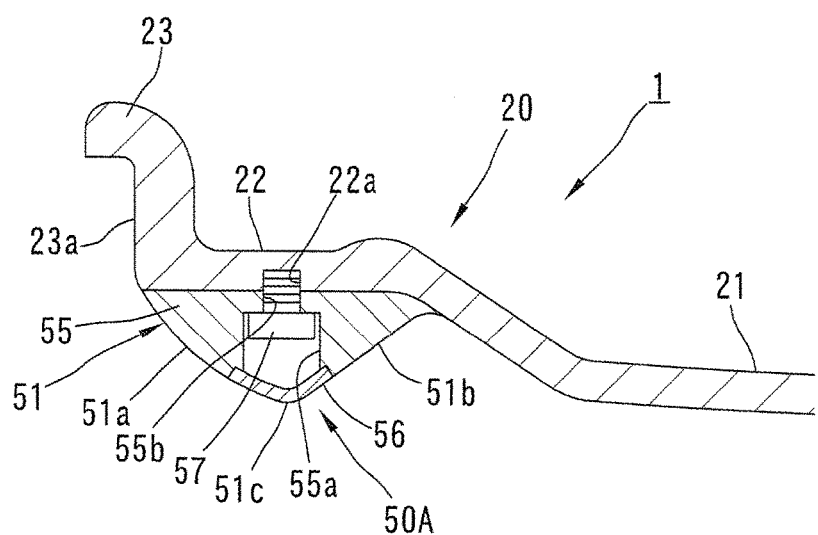
FIG. 6 is an enlarged cross-sectional view of a flow straightener of a wheel for vehicle according to a fifth embodiment of the present invention.

In a fifth embodiment shown in FIG. 6, a protruded portion 51 of a flow straightener 50A is composed of an annular member 55 and a cap 56 that are separate components from a rim 20. The annular member 55 having a generally mountain-shaped cross section includes an annular groove 55a and screw insertion holes 55b formed in a bottom surface of the groove 55a spaced from each other in a circumferential direction. The annular member 55 is fixed to a bead seat portion 22 of the rim 20 by screwing screws 57 inserted through the screw insertion holes 55b into screw holes 22a formed in an inner peripheral surface of the bead seat portion 22.

The cap 56 has a halved annular configuration having a bent cross-section. The groove 55a is closed by fixing the cap 56 to a top portion of the annular member 55.

A first inclined surface 51a and a second inclined surface 51b are formed in the annular member 55 and the cap 56. A top portion 51c is formed in the cap 56. The first inclined surface 51a is continuous from a side surface 23a of a rim flange portion 23 on a vehicle body side.

In place of the groove 55a, countersunk holes having a diameter larger than that of a bolt head may be provided at a position of a bolt hole. In this case, a cap 56 is provided for each countersunk hole.

Figure 7:
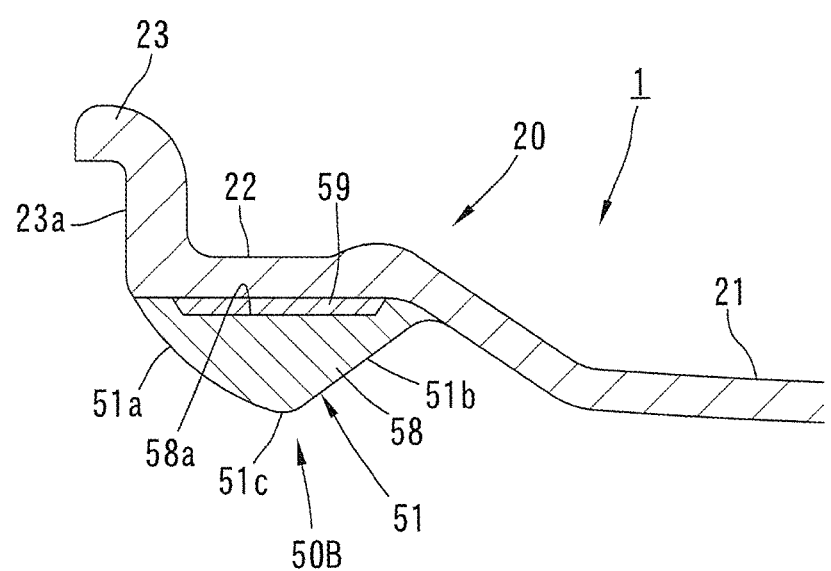
FIG. 7 is an enlarged cross-sectional view of a flow straightener of a wheel for vehicle according to a sixth embodiment of the present invention.

In a sixth embodiment shown in FIG. 7, a protruded portion 51 of a flow straightener 50B is an annular member 58 that is a separate component from a rim 20. The annular member 58 has first and second inclined surfaces 51a, 51b and a top portion 51c. A shallow recess 58a having an annular configuration is formed in an outer peripheral surface of the annular member 58. The annular member 58 is fixed to an inner peripheral surface of the bead seat portion 22 by adhesive 59 filled in the recess 58a.

The recess 58a may be continuously or intermittently formed in a circumferential direction.

The present invention is not limited to the embodiments described above, and various modifications can be adopted without departing from the scope and the spirit of the invention.

The flow straightener has a wall portion having a flat surface in the first and second embodiments. Alternatively, the flow straightener may not have a wall portion. In this case, the inclined surface of the flange portion continues to the side surface of the rim flange portion.

INDUSTRIAL APPLICABILITY

The present invention may be applied to a wheel for vehicle in which reduction of air resistance and cooling of a braking device are required.

The invention claimed is:

1. A wheel for vehicle comprising:
a disc;
a rim;
a braking device housed therein;
an annular flow straightener disposed at an end of the rim on a side opposite to the disc; and
the flow straightener having an annular protruded portion protruded inward from a bead seat portion of the rim in a radial direction of the wheel,
wherein the protruded portion has an annular inclined surface on a side opposite to the disc, the inclined surface inclined toward the disc in a direction toward a central axis of the wheel;
the inclined surface of the protruded portion is provided as a first inclined surface;
the protruded portion further has a second inclined surface having an annular configuration and oriented toward the disc;
the second inclined surface is inclined away from the disc in the direction toward the central axis of the wheel; and
an annular top portion is formed where the first inclined surface and the second inclined surface intersect with each other.

2. The wheel for vehicle according to claim 1, wherein the flow straightener is integrally formed with the rim.

3. The wheel for vehicle according to claim 1, wherein:
the flow straightener is a separate component from the rim; and
the flow straightener is attached to the rim.

4. A wheel for vehicle comprising:
a disc;
a rim;
a braking device housed therein;
an annular flow straightener disposed at an end of the rim on a side opposite to the disc; and
the flow straightener having an annular protruded portion protruded inward from a bead seat portion of the rim in a radial direction of the wheel,
wherein the protruded portion has an annular inclined surface on a side opposite to the disc, the inclined surface inclined toward the disc in a direction toward a central axis of the wheel;
the flow straightener has an annular wall portion extending along a rim flange portion of the rim;
a side surface of the wall portion on a side opposite to the disc is a flat surface orthogonal to the central axis of the wheel;
the side surface continues to the inclined surface;
the inclined surface of the protruded portion is provided as a first inclined surface;
the protruded portion further has a second inclined surface having an annular configuration and oriented toward the disc;
the second inclined surface is inclined away from the disc in the direction toward the central axis of the wheel; and
an annular top portion is formed where the first inclined surface and the second inclined surface intersect with each other.

5. A wheel for vehicle comprising:
a disc;
a rim;
a braking device housed therein,
an annular flow straightener disposed at an end of the rim on a side opposite to the disc; and
the flow straightener having an annular protruded portion protruded inward from a bead seat portion of the rim in a radial direction of the wheel,
wherein the protruded portion has an annular inclined surface on a side opposite to the disc, the inclined surface inclined toward the disc in a direction toward a central axis of the wheel;
the inclined surface is inclined 5 to 15 degrees with respect to a plane orthogonal to the central axis of the wheel;
the inclined surface of the protruded portion is provided as a first inclined surface;

the protruded portion further has a second inclined surface having an annular configuration and oriented toward the disc;

the second inclined surface is inclined away from the disc in the direction toward the central axis of the wheel; and an annular top portion is formed where the first inclined surface and the second inclined surface intersect with each other.

\* \* \* \* \*